US012570269B2

(12) United States Patent
Koishi

(10) Patent No.:    US 12,570,269 B2
(45) Date of Patent:        Mar. 10, 2026

(54) METHOD AND DEVICE FOR CONTROLLING STARTING AND STOPPING OF INTERNAL COMBUSTION ENGINE IN HYBRID VEHICLE

(71) Applicant: Nissan Motor Co., Ltd., Yokohama (JP)

(72) Inventor: Akifumi Koishi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 323 days.

(21) Appl. No.: 18/578,750

(22) PCT Filed: Jul. 26, 2021

(86) PCT No.: PCT/JP2021/027467

§ 371 (c)(1),
(2) Date: Jan. 12, 2024

(87) PCT Pub. No.: WO2023/007528

PCT Pub. Date: Feb. 2, 2023

(65) Prior Publication Data

US 2024/0317211 A1        Sep. 26, 2024

(51) Int. Cl.
*B60W 20/40*        (2016.01)
*B60W 20/12*        (2016.01)

(52) U.S. Cl.
CPC ............ *B60W 20/40* (2013.01); *B60W 20/12* (2016.01); *B60W 2510/0676* (2013.01)

(58) Field of Classification Search
CPC .................. B60W 20/40; B60W 20/12; B60W 2510/0676; B60W 2510/068; B60W 2510/244; B60W 2530/12; B60W 2556/50; B60W 2710/0688; B60W 2710/0694; B60W 10/08; B60W 10/26; B60W 20/16; B60W 10/06; B60W 20/11; B60W 30/192;

(Continued)

(56) References Cited

U.S. PATENT DOCUMENTS 8,972,148 B2        3/2015  Nawata et al.

FOREIGN PATENT DOCUMENTS

CN        103370245 A  *  10/2013  ............. B60K 6/445
CN        104061083 A  *  9/2014  ............ B60W 20/00

(Continued)

OTHER PUBLICATIONS

Extended European Search Report of Sep. 4, 2024 of corresponding European Patent Application No. 21951132.6.

*Primary Examiner* — Hung Q Nguyen
(74) *Attorney, Agent, or Firm* — Spencer Fane LLP

(57)        ABSTRACT

An internal combustion engine of a series hybrid vehicle starts generating power when a catalyst temperature or a coolant temperature has decreased to an activation temperature or a lower limit water temperature, and stops generating power when the catalyst temperature or the coolant temperature reaches an operation end temperature. A target duration time of EV mode operation is set, and respective temperature decrease rates are used to set the operation end temperature so that a difference in temperature relative to the activation temperature will be "$\Delta TC = Ra \times Tev$," and to set the operation end temperature so that a difference in temperature relative to the lower limit water temperature will be "$\Delta TW = Rb \times Tev$."

8 Claims, 9 Drawing Sheets

(58) Field of Classification Search
CPC .... B60W 30/194; B60W 40/02; B60W 40/10;
B60W 50/0097; B60K 6/46; Y02T 10/62
See application file for complete search history.

(56) References Cited

FOREIGN PATENT DOCUMENTS

| | | | | | |
|----|-------------|------|---|---------|------------|
| DE | 60319924 | T2 | * | 4/2009 | ............. B60K 6/445 |
| JP | 3576969 | B2 | * | 10/2004 | |
| JP | 3578044 | B2 | * | 10/2004 | .............. B60K 6/48 |
| JP | 2005-163545 | A | | 6/2005 | |
| JP | 2010-221897 | A | | 10/2010 | |
| JP | 5217991 | B2 | | 6/2013 | |
| JP | 2016088128 | A | * | 5/2016 | ........... B60W 20/16 |
| JP | 2016112910 | A | * | 6/2016 | |
| WO | 2012/131941 | A1 | | 10/2012 | |

* cited by examiner

1

METHOD AND DEVICE FOR CONTROLLING STARTING AND STOPPING OF INTERNAL COMBUSTION ENGINE IN HYBRID VEHICLE

CROSS-REFERENCE TO RELATED APPLICATIONS

This application is a U.S. national stage application of International Application No. PCT/JP2021/027467, filed on Jul. 26, 2021.

BACKGROUND

Technical Field

The present invention relates to a feature in which the starting and stopping of an internal combustion engine in a hybrid vehicle is controlled in order to keep the internal combustion engine warmed up.

Background Information

An internal combustion engine in a hybrid vehicle depends on the type of hybrid vehicle, but in many types, the internal combustion engine is not always operated continuously, being operated only when there is a demand for power generation or in situations such as those where high driving force is required. In such cases, it is generally undesirable for the temperature of the internal combustion engine to drop while the engine is not in combustion operation.

Japanese Laid-open Patent Application No. 2005-163545 (Patent Citation 1) discloses that an internal combustion engine is set to a driving state when it is detected that a temperature of coolant for the internal combustion engine is lower than a predetermined temperature, and the internal combustion engine is set to a non-driving state when it is detected that the coolant temperature is higher than the predetermined temperature. In other words, the coolant temperature is simply compared with the predetermined temperature and starting and stopping are repeated.

In such a configuration, starting and stopping of the internal combustion engine will be repeated frequently, which is undesirable.

SUMMARY

In a starting and stopping control method for an internal combustion engine in a hybrid vehicle according to this invention, the internal combustion engine is started when one or more temperature parameters of the internal combustion engine decrease to a first threshold value during EV mode operation of the vehicle without combustion operation of the internal combustion engine, and the internal combustion engine is stopped when the temperature parameters have increased to a second threshold value. A target duration time is determined for the EV mode operation after stopping the internal combustion engine, and the second threshold value is set so as to obtain the target duration time based on a temperature reduction characteristic during the EV mode operation.

By setting the second threshold value in this manner, the timing at which the temperature parameters actually decrease to the first threshold value and the internal combustion engine is started will correspond to the target time over which EV mode operation is to continue, and the starting and stopping of the internal combustion engine will not be repeated frequently.

BRIEF DESCRIPTION OF THE DRAWINGS

Referring now to the attached drawings which form a part of this original disclosure.

DETAILED DESCRIPTION OF EMBODIMENTS

Figure 1:
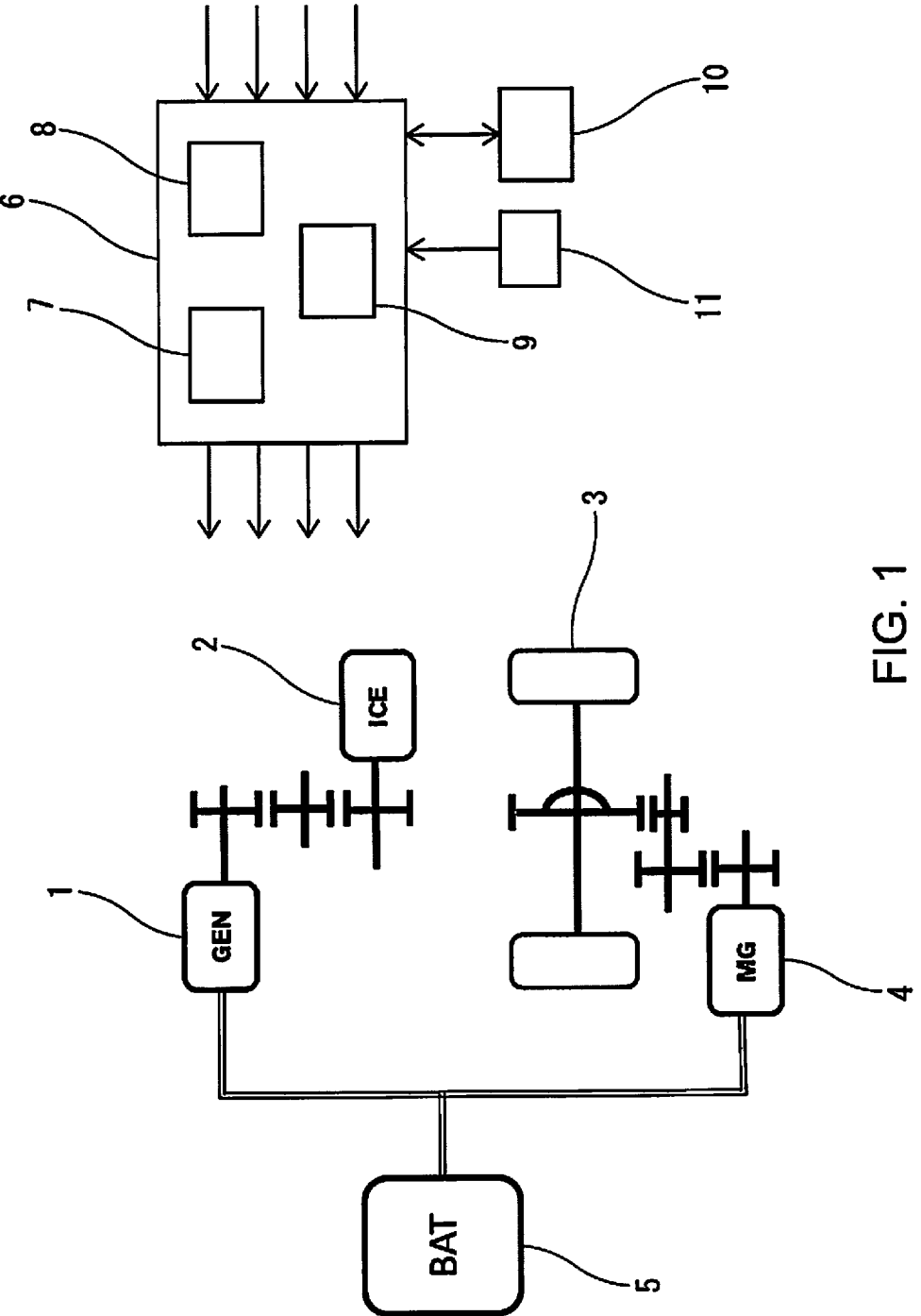
FIG. 1 is a diagram for describing a configuration of a series hybrid vehicle to which the starting and stopping control according to this invention is applied.

FIG. 1 schematically depicts a configuration of a series hybrid vehicle as an example of a hybrid vehicle to which this invention is applied. The series hybrid vehicle comprises a power generation motor generator 1 that mainly operates as an electric generator, an internal combustion engine 2 used as a power generation internal combustion engine that drives the power generation motor generator 1 in accordance with a power request, a travel motor generator 4 that mainly operates as a motor and drives drive wheels 3, and a battery 5 that temporarily stores the generated power. The power obtained due to the internal combustion engine 2 driving the power generation motor generator 1 is stored in the battery 5 via an inverter device (not shown). The travel motor generator 4 is drivably controlled using the power of the battery 5. Regeneration power from the travel motor generator 4 is also stored in the battery 5 via an inverter device (not shown).

The operation of the motor generators 1 and 4, charging and discharging of the battery 5, and operation of the internal combustion engine 2 are controlled by a controller 6. The controller 6 is constituted of a plurality of controllers connected to as to be communicable with each other, such as a motor controller 7 that controls the motor generators 1 and 4, an engine controller 8 that controls the internal combustion engine 2, and a battery controller 9 that manages the battery 5. The controller 6 receives input of information such as a position of an acceleration pedal (not shown), and vehicle speed. The battery controller 9 determines an SOC of the battery 5 on the basis of a voltage and a current of the battery 5. Basically, the engine controller 8 is requested to start the internal combustion engine 2 on the basis of a decrease in the SOC. Operating modes of such a series hybrid vehicle include EV mode, in which the vehicle travels on electric power from the battery 5 without the combustion operation of the internal combustion engine 2, and HEV mode, in which the vehicle travels while electricity is generated through the combustion operation of the internal combustion engine 2.

A vehicle of one embodiment is provided with a car navigation system 10 that uses GPS and includes highly accurate map information to obtain information on the location of the vehicle, the road the vehicle will be traveling on, and the surrounding environment. The vehicle is also provided with one or more information acquisition devices 11, such as a camera, to obtain information on the forward and surrounding environments. In addition, a "connected car" may have a connected system that constantly exchanges various information with the outside using an information communication function.

Figure 2:
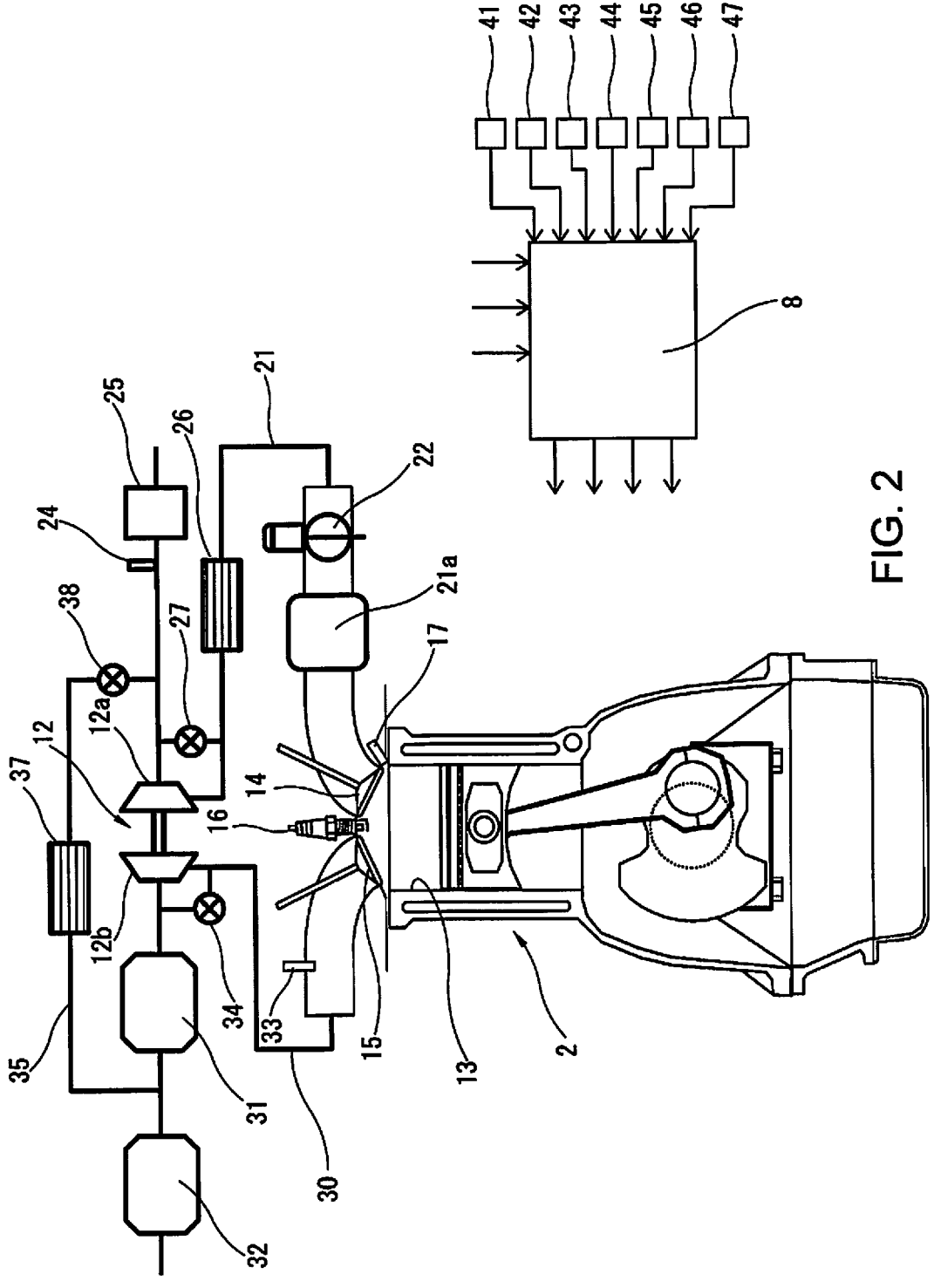
FIG. 2 is a diagram for describing a configuration of an internal combustion engine.

FIG. 2 shows a system configuration of the internal combustion engine 2. The internal combustion engine 2 is, for example, a four-stroke cycle spark ignition internal combustion engine provided with a turbocharger 12, wherein a pair of intake valves 14 and a pair of exhaust valves 15 are disposed on a ceiling wall surface of each cylinder 13, and a spark plug 16 is disposed in the center surrounded by the intake valves 14 and exhaust valves 15. A fuel injection valve 17 that supplies fuel into the cylinder 13 is provided below the intake valves 14. An ignition timing of the spark plug 16 and an injection timing and injection amount of fuel via the fuel injection valve 17 are controlled by the engine controller 8.

An intake passage 21 has an intake collector 21a, and an electronically controlled throttle valve 22 of which a position is controlled according to a control signal from the engine controller 8 is provided upstream of the intake collector 21a. A compressor 12a of the turbocharger 12 is located upstream of the throttle valve 22, and an air flow meter 24 and an air cleaner 25 for detecting an amount of intake air are provided upstream of the compressor 12a. For example, a water-cooled intercooler 26 is provided between the compressor 12a and the throttle valve 22 in order to cool high-temperature, high-pressure intake air. A recirculation valve 27 is provided to communicate a discharge side and an intake side of the compressor 12a.

A turbine 12b of the turbocharger 12 is located in an exhaust passage 30, and a pre-catalyst device 31 and a main catalyst device 32, each composed of a three-way catalyst, are disposed on a downstream side of the turbine 12b. The pre-catalyst device 31 is disposed in an outlet of the turbine 12b, and the main catalyst device 32 is disposed underneath the floor of the vehicle. An air-fuel ratio sensor 33 that detects an air-fuel ratio is disposed upstream of the turbine 12b of the exhaust passage 30. The turbine 12b is provided with a wastegate valve 34 that bypasses part of the exhaust in accordance with boost pressure in order to control the boost pressure. The wastegate valve 34 is, for example, an electric type of valve of which the position is controlled by the engine controller 8.

Also provided is an exhaust recirculation passage 35 that recirculates part of the exhaust from the exhaust passage 30 to the intake passage 21, and the exhaust recirculation passage 35 is provided with, for example, a water-cooled EGR gas cooler 37 and an EGR valve 38.

The engine controller 8 receives input of detection signals from various sensors in addition to the abovementioned air flow meter 24 and air-fuel ratio sensor 33, such as a crank angle sensor 41 for detecting an engine rotation speed, a water temperature sensor 42 that detects a coolant temperature, catalyst temperature sensors 43 and 44 that respectively detect catalyst temperatures of the pre-catalyst device 31 and the main catalyst device 32, an atmospheric pressure sensor 45 that detects atmospheric pressure, an outside air temperature sensor 46 that detects outside air temperature, and a boost pressure sensor 47 that detects boost pressure. The engine controller 8 optimally controls the fuel injection amount, the injection timing, the ignition timing, the position of the throttle valve 22, the boost pressure, etc., on the basis of these detection signals and requests from the other controllers 7 and 9. Instead of directly detecting a catalyst carrier temperature, the catalyst temperature sensors 43 and 44 may indirectly determine the catalyst temperature from preceding and following gas temperatures, etc.

Basically, the internal combustion engine 2 is started when the SOC of the battery 5 decreases to a predetermined starting SOC value, and the internal combustion engine 2 is stopped when the SOC reaches a sufficient level. In addition to the starting and stopping of the internal combustion engine 2 based on such a power generation request, the internal combustion engine 2 is started and stopped in order to appropriately maintain a warmed-up state of the internal combustion engine 2. In one embodiment, catalyst temperature and coolant temperature are monitored as temperature parameters indicating the warmed-up state of internal combustion engine 2. As the catalyst temperature, in one example, the temperature of the pre-catalyst device 31 detected by the catalyst temperature sensor 43 is typically used, but the temperature of the main catalyst device 32 may also be used.

Figure 5:
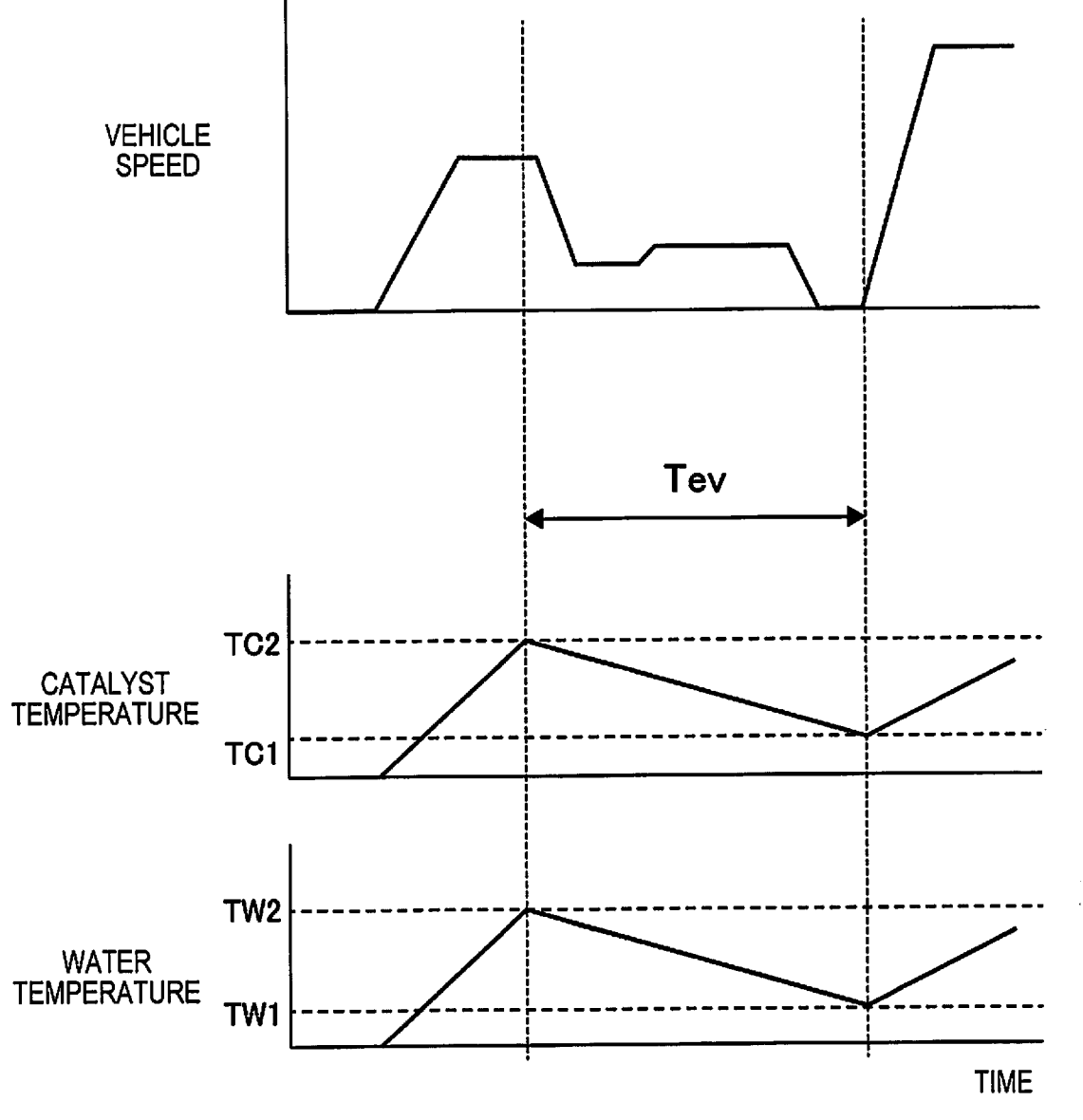
FIG. 5 is a diagram for describing an example of change in a catalyst temperature and a coolant temperature.

FIG. 5 shows basic starting and stopping of the internal combustion engine 2 based on (a) catalyst temperature and (b) coolant temperature while the vehicle is traveling. For example, the internal combustion engine 2 is started when the catalyst temperature drops to a predetermined activation temperature TC1 corresponding to a first threshold value. Thereafter, as the internal combustion engine 2 operates, the internal combustion engine 2 stops when the catalyst temperature rises to an operation end temperature TC2 corresponding to a second threshold value. When the internal combustion engine 2 stops, the catalyst temperature gradually decreases due to, inter alia, natural heat dissipation and a cooling effect provided by traveling wind. The internal combustion engine 2 is started again when the catalyst temperature decreases to the activation temperature TC1. The catalyst temperature is maintained at or above the activation temperature TC1 by such repetition. The vehicle travels in the EV mode previously described while the internal combustion engine 2 is stopped.

The same applies to the coolant temperature, and the internal combustion engine 2 is started when the coolant temperature decreases to a predetermined lower limit water temperature TW1 corresponding to a first threshold value. Thereafter, as the internal combustion engine 2 operates, the internal combustion engine 2 stops when the coolant temperature increases to an operation end temperature TW2 corresponding to a second threshold value. When the internal combustion engine 2 stops, the coolant temperature gradually decreases due to, inter alia, natural heat dissipation and a cooling effect provided by traveling wind. The internal combustion engine 2 is started again when the coolant temperature decreases to the lower limit water temperature TW1. The coolant temperature is maintained at or above the lower limit water temperature TW1 by such repetition. The lower limit water temperature TW1 is set, for example, to a temperature comparable to a warm-up completion temperature of a general internal combustion engine.

It is desirable that the timing at which the catalyst temperature decreases to the activation temperature TC1 and the timing at which the coolant temperature decreases to the lower limit water temperature TW1 are as similar as possible, but when the two are different, in one embodiment, the internal combustion engine 2 is started when either temperature decreases to the activation temperature TC1 or the lower limit water temperature TW1. The internal combustion engine 2 may also be started when both temperatures decrease to the activation temperature TC1 and the lower limit water temperature TW1.

Similarly, it is desirable that the timing at which the catalyst temperature reaches the operation end temperature TC2 and the timing at which the coolant temperature reaches the operation end temperature TW2 are as similar as possible but when the two are different, in one embodiment, the internal combustion engine 2 is stopped when both the catalyst temperature and the coolant temperature reach the operation end temperatures TC2 and TW2. The internal combustion engine 2 may also be stopped when either temperature reaches the operation end temperatures TC2 and TW2.

The operation end temperatures TC2 and TW2 may be set on the basis of a characteristic regarding a decrease in temperature during EV mode operation for both the catalyst temperature and the coolant temperature so that a continuation time (the time from the stopping of the internal combustion engine 2 to the next starting) of EV mode operation after the internal combustion engine 2 has been stopped will be a desired target duration time.

Figure 3:
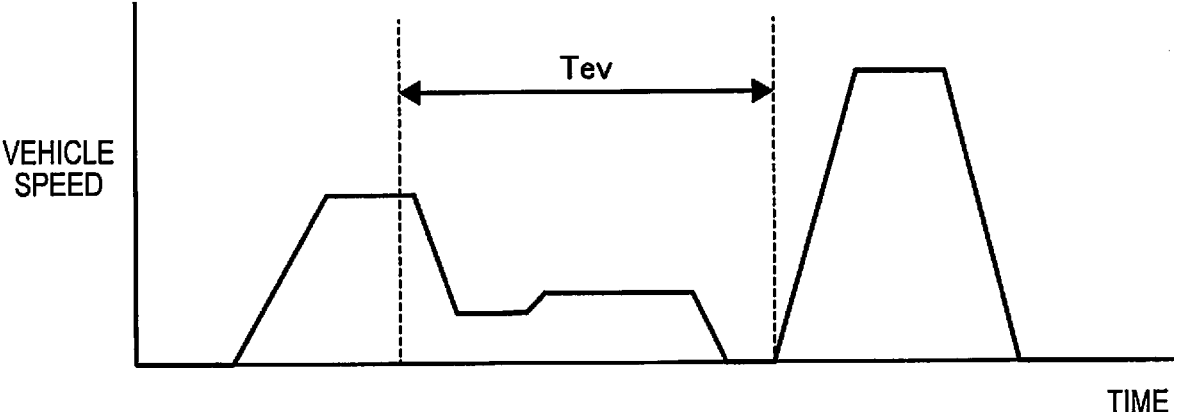
FIG. 3 is a characteristic diagram of a relationship between a typical travel pattern and a target duration time in a first embodiment.

In the first embodiment of the present invention, a target time over which EV mode operation is to continue is given as a fixed value in advance with reference to statistical processing of travel patterns (e.g., WLTC, etc.) representative of the market, such as is illustrated in FIG. 3. For example, in the travel pattern illustrated in FIG. 3, a target duration time Tev of EV mode operation is set corresponding to a period of relatively gentle driving within this pattern. In one example, the target duration time Tev can be approximately several minutes.

Figure 4:
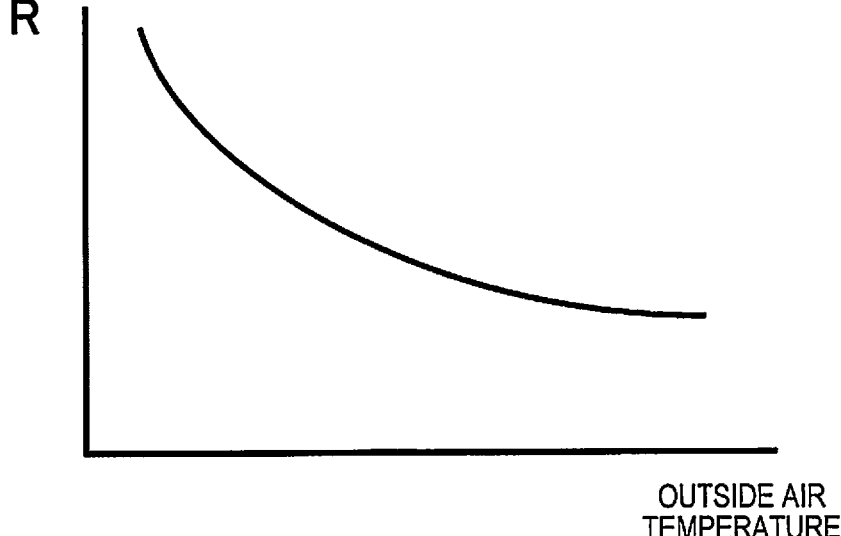
FIG. 4 is a characteristic diagram of a relationship between outside air temperature and rate of temperature decrease.

Next, for both the catalyst temperature and the coolant temperature, a rate of temperature decrease R per unit time is given as a characteristic regarding a decrease in temperature during EV mode operation. Ra is the rate of temperature decrease of the catalyst temperature, and Rb is the rate of temperature decrease of the coolant temperature. The rate of temperature decrease R may be an empirically determined fixed value, but in one embodiment, this rate is determined as a function of outside air temperature and/or vehicle speed. FIG. 4 shows, for example, the characteristics of the rate of temperature decrease R with respect to the outside air temperature, and the rate of temperature decrease R increases commensurately with progressively lower outside air temperatures. The same applies to the vehicle speed, and the rate of temperature decrease R increases commensurately with progressively higher vehicle speeds. In addition, the rate of temperature decrease Rb of the coolant temperature may be set to a different value depending on whether a heating switch in a vehicle air conditioner is on or off. That is, when the heating switch is on, heat is consumed for heating, and the rate of temperature decrease Rb therefore becomes relatively large. As shall be apparent, when determining the rate of temperature decrease R, conditions other than the above-mentioned outside temperature, vehicle speed, and whether the heating switch is on or off may be taken into consideration.

The operation end temperature TC2 for the catalyst temperature is set so that a difference in temperature $\Delta TC$ (=TC2−TC1) relative to the activation temperature TC1 will be "$\Delta TC=Ra \times Tev$." Similarly, the operation end temperature TW2 for the coolant temperature is set so that a difference in temperature $\Delta TW$ (=TW2−TW1) relative to the lower limit water temperature TW1 will be "$\Delta TW=Rb \times Tev$."

Due to the operation end temperatures TC2 and TW2 being set in this manner, as can be easily understood from FIG. 5, if the catalyst temperature and the coolant temperature are at the respective operation end temperatures TC2 and TW2 when combustion operation of the internal combustion engine 2 is stopped, ideally, the target duration time Tev of EV mode operation is ensured before the catalyst temperature and the coolant temperature next decrease to the activation temperature TC1 and the lower limit water temperature TW1. The timing at which the catalyst temperature reaches the activation temperature TC1 and the timing at which the coolant temperature reaches the lower limit water temperature TW1 would then coincide with each other.

Figure 6:
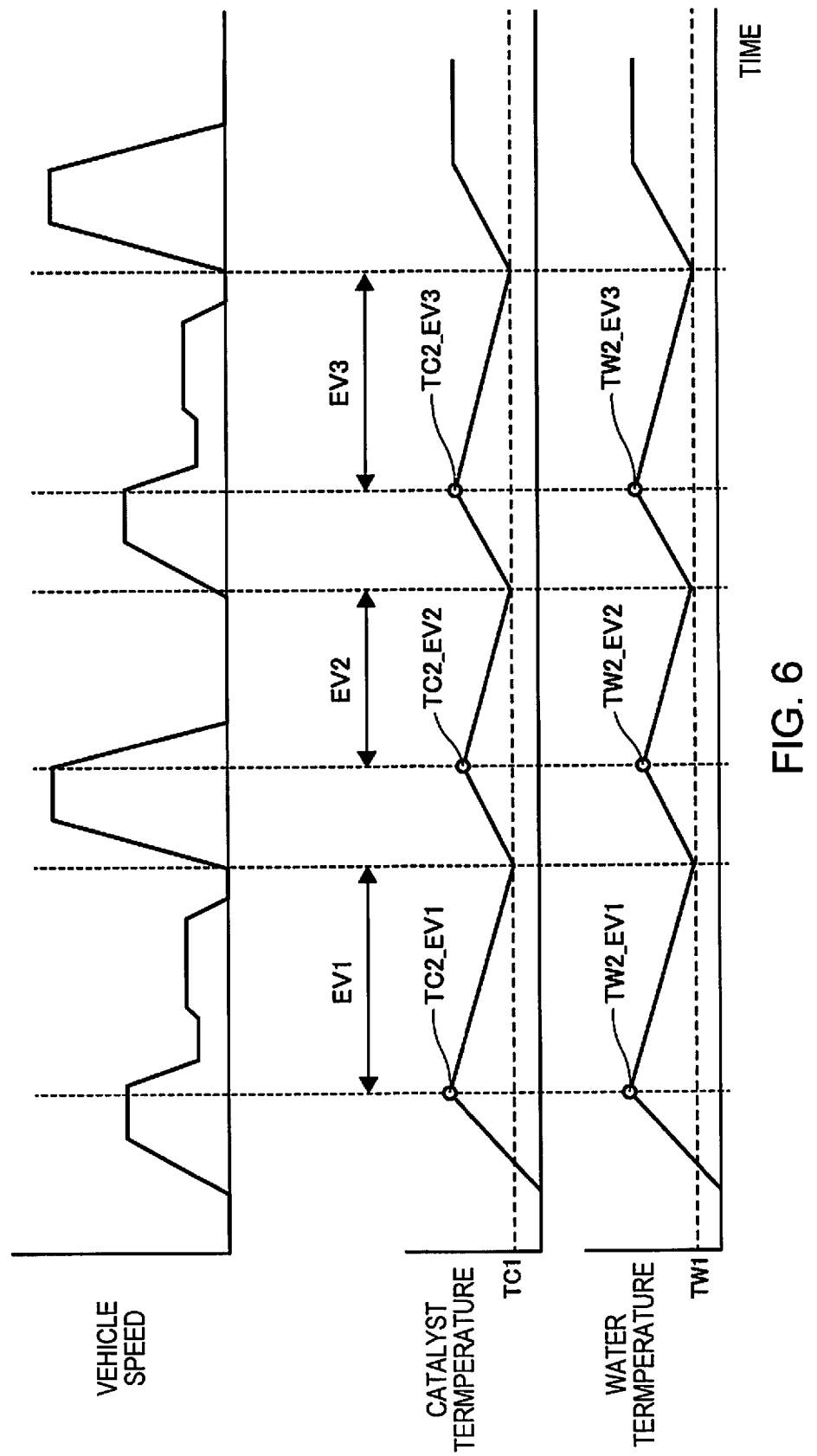
FIG. 6 is a characteristic diagram of a relationship between estimated travel pattern, catalyst temperature, and coolant temperature in a second embodiment.

A second embodiment, in which a travel pattern along a travel route of a host vehicle is estimated and a preferred start timing and stop timing are determined from this travel pattern, shall be described on the basis of FIG. 6. The vehicle of this embodiment is provided with a car navigation system 10 that includes highly accurate map information to obtain information on the location of the host vehicle, roads the host vehicle will be traveling on, and the surrounding environment, and the vehicle can obtain various information via information acquisition devices 11 and a connected system. Using this road information, past travel data for the host vehicle, traffic statistical data, etc., the controller 6 predicts a travel pattern such as, for example, that illustrated in the upper row of FIG. 6, and determines starting and stopping timings (in other words, periods to use EV mode operation) with which consumption can be optimized in the host vehicle within the predicted travel pattern. In FIG. 6, "EV1," "EV2," and "EV3" indicate periods to use EV mode operation within the predicted travel pattern. That is, in the second embodiment, the target duration time Tev of EV mode operation would be dynamically given on the basis of the predicted travel pattern.

The operation end temperatures TC2 and TW2 for the catalyst temperature and the coolant temperature are, as in the previously described first embodiment, determined on the basis of the target duration time Tev of EV mode operation and the rate of temperature decreases Ra and Rb. As is clear in FIG. 6, the lengths of the periods (times) of "EV1," "EV2," and "EV3" are different, and the operation end temperatures TC2 and TW2 therefore have different values at "EV1," "EV2," and "EV3." Conversely, by appropriately setting the operation end temperatures TC2 and TW2, the target time over which EV mode operation is to continue will be appropriately obtained as shown in "EV1," "EV2," and "EV3." In FIG. 6, the operation end temperatures for "EV1," "EV2," and "EV3" are shown as "TC2_EV1," etc.

Figure 7:
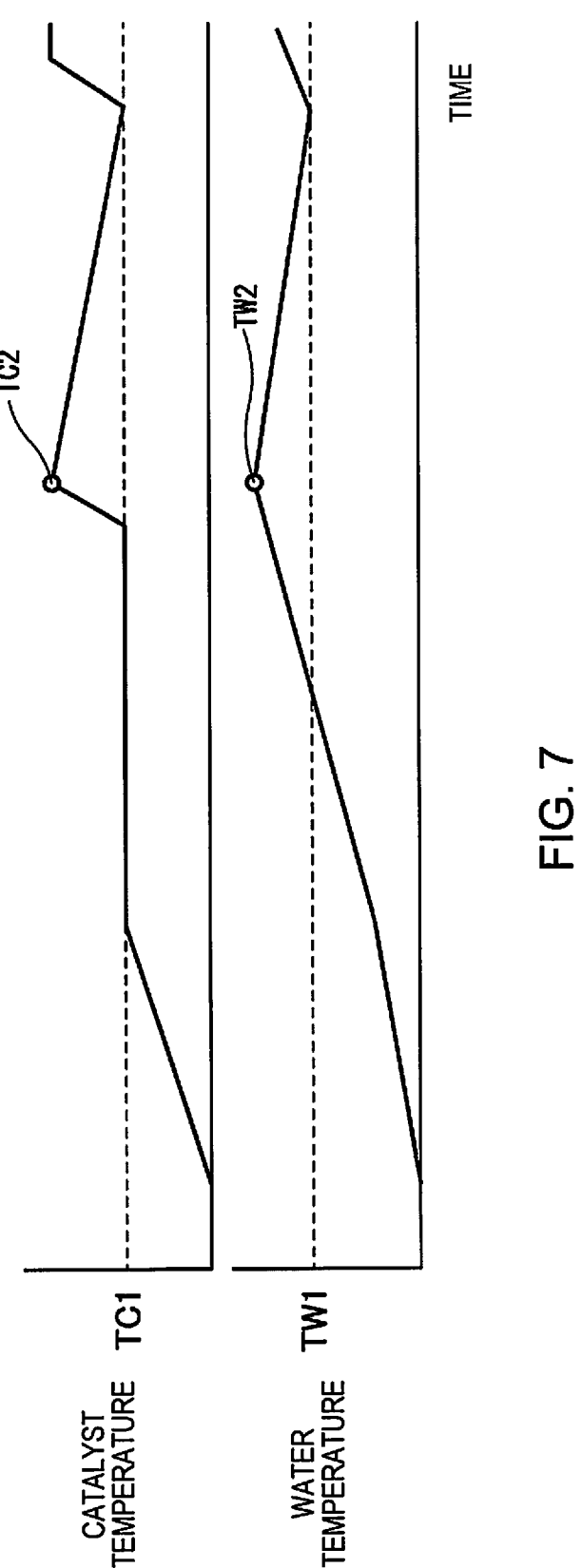
FIG. 7 is a characteristic diagram of an example of temperature change in a third embodiment, in which exhaust temperature increase control is performed.

Next, a third embodiment, which includes exhaust temperature increase control for making the catalyst temperature reach the operation end temperature TC2 at the same time as the coolant temperature, shall be described on the basis of FIG. 7. In order to minimize energy consumption, it is preferable that both the catalyst temperature and the coolant temperature reach the operation end temperatures TC2 and TW2 at a timing when the internal combustion engine 2 is about to be stopped. Generally, responsiveness to coolant temperature changes is lower than responsiveness to catalyst temperature changes; therefore, the decision to stop the internal combustion engine 2 is made by waiting for the coolant temperature to reach the operation end temperature TW2, but if the catalyst temperature reaches the operation end temperature TW2 too early, exhaust heat will be wasted. Therefore, in the third embodiment, the increase in coolant temperature is monitored without raising the catalyst temperature excessively higher than the activation temperature TC1, and exhaust temperature increase control is started at a timing at which the coolant temperature approaches the operation end temperature TW2. This exhaust temperature increase control causes the catalyst temperature to rise rapidly, and the catalyst temperature therefore reaches the operation end temperature TC2 almost at the same time as the coolant temperature. Exhaust temperature increase control can be realized, for example, by retarding ignition timing or other known methods.

By thus quickly raising the catalyst temperature to the operation end temperature TC2 immediately before the coolant temperature reaches the operation end temperature TW2, unnecessary loss of exhaust heat can be minimized.

Figure 8:
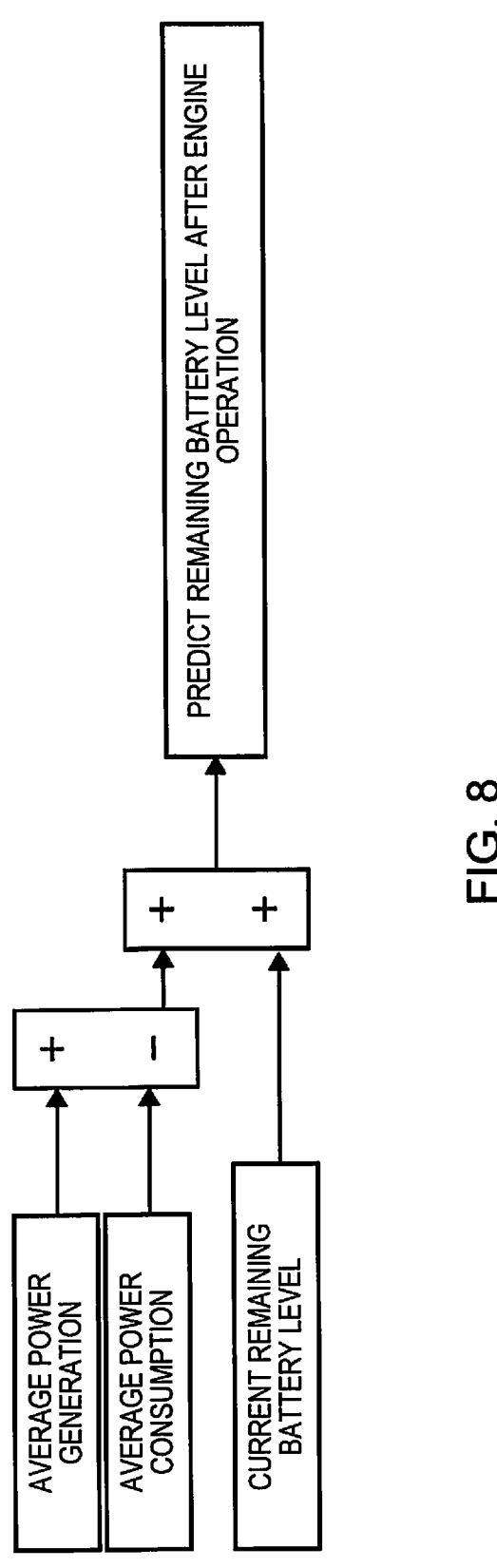
FIG. 8 is a diagram for describing prediction of battery SOC in a fourth embodiment.
Figure 9:
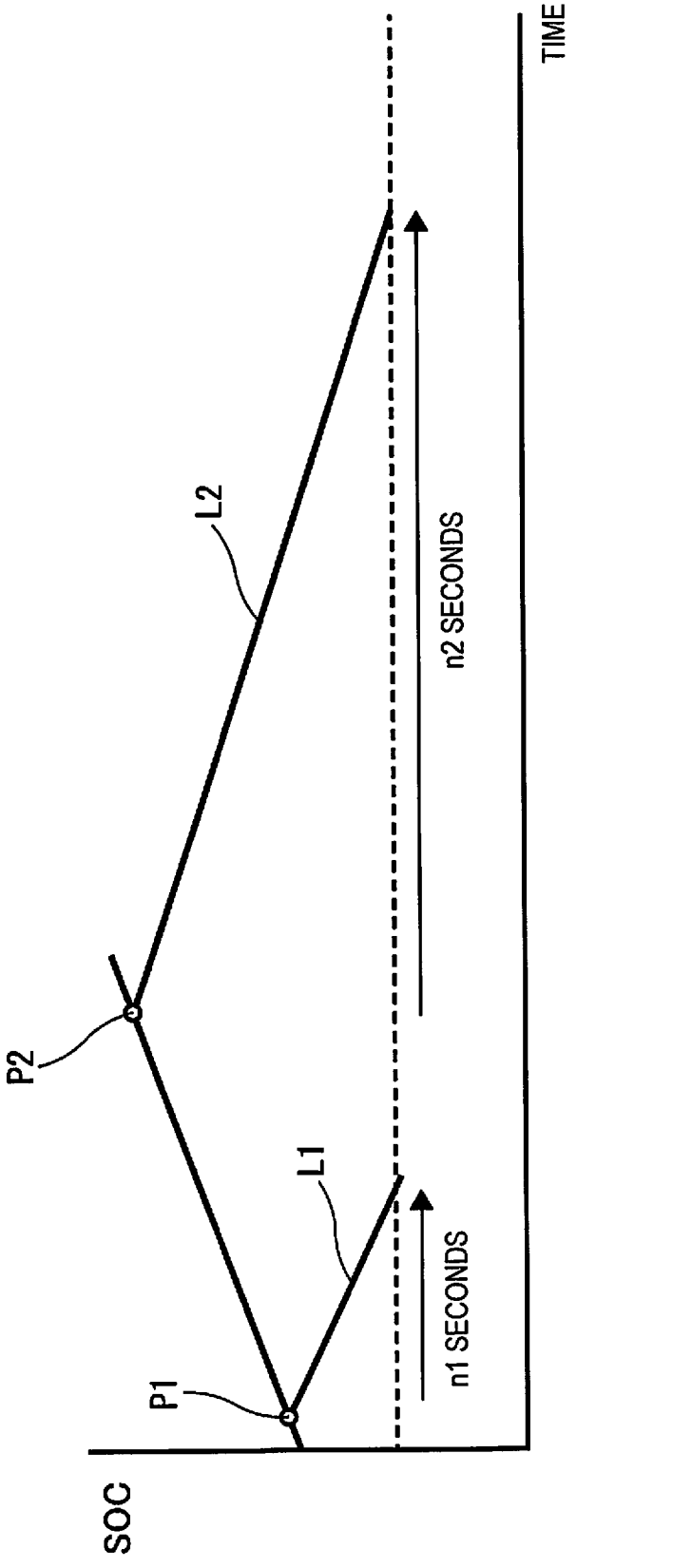
FIG. 9 is a diagram for describing SOC change after internal combustion engine stoppage.

Next, a fourth embodiment, in which the starting of the internal combustion engine 2 based on a decrease in SOC is also taken into consideration to extend the time over which EV mode operation is to continue to a maximum limit, shall be described on the basis of FIGS. 8 and 9. When the internal combustion engine 2 is driven to maintain a warmed-up state, power is generated by the power generation motor generator 1, and the SOC of the battery 5 therefore increases in many cases. FIG. 8 uses a block diagram to show the logic of estimating the SOC of the battery 5 with the combustion operation of the internal combustion engine 2, and by subtracting an average power consumption from an average power generation amount and adding a current remaining level (that is, the current SOC) of the battery 5, it is possible to estimate the remaining level of the battery 5 after the combustion operation of the internal combustion engine 2 has been continued for a certain time (that is, the SOC at an operation stoppage).

FIG. 9 shows an example of a change in the SOC of the battery 5 due to combustion operation and EV mode operation of the internal combustion engine 2. In particular, FIG. 9 shows a comparison of a case in which the target duration time Tev of EV mode operation previously described is set relatively short (that is, the operation end temperatures TC2 and TW2 are relatively low) and a case in which the target duration time Tev is set relatively long (that is, the operation end temperatures TC2 and TW2 are relatively high).

Line L1 is an example in which the target duration time Tev is set short, and at a point indicated as point P1, the internal combustion engine 2 stops (that is, power generation ends) and the SOC begins to decrease due to EV mode operation. In such cases, after the internal combustion engine 2 stops, the internal combustion engine 2 may be started due to a power generation request relatively early (n1 seconds), and the starting of the internal combustion engine 2 may be initiated even if there is more than enough time before the start request in terms of the catalyst temperature and the coolant temperature. That is, a time over which EV mode operation is to continue corresponding to the operation end temperatures TC2 and TW2 is not obtained.

Line L2 is an example in which the target duration time Tev is set long, and at a point indicated as point P2, the internal combustion engine 2 stops (that is, power generation ends) and the SOC begins to decrease due to EV mode operation. In this case, since the SOC at the time of stoppage is high, it takes a long time (n2 seconds) until a power generation request is issued, the catalyst temperature and coolant temperature first decrease to the activation temperature TC1 or the lower limit water temperature TW1, and a warm-up start requests may be issued.

Therefore, there is an optimal stop timing for the internal combustion engine 2 between line L1 and line L2 (in other words, between points P1 and P2), and if there is a shift to EV mode operation from this optimal stop timing, the timing of a start request based on the decrease in SOC and the timing of a start request based on the decrease in the temperature of the internal combustion engine 2 (the decrease in the active temperature TC1 or the lower limit water temperature TW1) will coincide with each other. The condition in which the timing of the start requests based on the two conditions coincide in this manner is the condition in which the time over which EV mode operation is to continue can be brought to a maximum limit.

The controller 6 successively predicts the timings of the two start requests, and determines the target duration time Tev and the corresponding end temperatures TC2 and TW2 so that the timings match.

An embodiment of the invention was described above in detail, but the above embodiment is not provided by way of limitation on the invention; various changes can be made. For example, the above embodiment used a series hybrid vehicle as an example, but the present invention can be widely applied to any type of hybrid vehicle capable of EV mode operation.

The above embodiment used catalyst temperature and coolant temperature as examples of temperature parameters, but using only one as a parameter is also an acceptable option, as is using other temperature parameters besides these.

In addition, the first threshold value regulating the starting of the internal combustion engine 2 is not necessarily limited to being a fixed value. In cases such as when the first threshold value changes under some conditions, the second threshold value may be changed accordingly.

In addition, the timings of starting and stopping the engine do not necessarily need to be determined by the controller 6 in the vehicle; in some cases, the timings may be provided from a connected service, e.g., a cloud environment on the basis of a travel plan or travel pattern analysis for the host vehicle. That is, even with an in-vehicle controller 6 that issues final start and stop instructions to the engine, the vehicle does not necessarily need to have a function for deciding start and stop timings.

The invention claimed is:

1. A starting and stopping control method for an internal combustion engine in a hybrid vehicle, the starting and stopping control method comprising:
   starting the internal combustion engine when one or more temperature parameters of the internal combustion engine have decreased to a first threshold value during EV mode operation of the vehicle without a combustion operation of the internal combustion engine;
   stopping the internal combustion engine when the temperature parameters have increased to a second threshold value;
   determining a target duration time for the EV mode operation after stopping the internal combustion engine; and
   setting the second threshold value so as to obtain the target duration time based on a temperature reduction characteristic during the EV mode operation, the temperature reduction characteristic being given as a function of at least one of outside air temperature and vehicle speed.

2. The starting and stopping control method according to claim 1, wherein the target duration time is set in advance to a predetermined value.

3. The starting and stopping control method according to claim 1, wherein the temperature parameter is a temperature of coolant in the internal combustion engine.

4. The starting and stopping control method according to claim 1, wherein the temperature parameter is a temperature of a catalyst in the internal combustion engine.

5. The starting and stopping control method according to claim 1, wherein the temperature parameters include a temperature of coolant and a temperature of a catalyst in the internal combustion engine;

the first threshold value and a second threshold value are provided for each of the coolant temperature and the catalyst temperature; and after the internal combustion engine has been started, executing exhaust temperature increase control of the internal combustion engine to cause the catalyst temperature to reach the second threshold value when the coolant temperature has approached the second threshold value.

6. A starting and stopping control method for an internal combustion engine in a hybrid vehicle, the starting and stopping control method comprising:

starting the internal combustion engine when one or more temperature parameters of the internal combustion engine have decreased to a first threshold value during EV mode operation of the vehicle without a combustion operation of the internal combustion engine;

stopping the internal combustion engine when the temperature parameters have increased to a second threshold value;

determining a target duration time for the EV mode operation after stopping the internal combustion engine;

setting the second threshold value so as to obtain the target duration time based on a temperature reduction characteristic during the EV mode operation;

after the internal combustion engine has started, predicting an SOC of a battery for when the internal combustion engine stopped operating from a power balance between a power generation by the operation of the internal combustion engine and a power consumption by the EV mode operation;

predicting a timing of a start request of the internal combustion engine based on a decrease in the SOC when the EV mode operation is performed from the SOC that was predicted; and setting the target duration time for the EV mode operation so that the timing of the start request of the internal combustion engine based on the decrease in the SOC coincides with the starting based on the temperature parameter.

7. A starting and stopping control method for an internal combustion engine in a hybrid vehicle, the starting and stopping control method comprising:

starting the internal combustion engine when one or more temperature parameters of the internal combustion engine have decreased to a first threshold value during EV mode operation of the vehicle without a combustion operation of the internal combustion engine;

stopping the internal combustion engine when the temperature parameters have increased to a second threshold value;

determining a target duration time for the EV mode operation after stopping the internal combustion engine;

setting the second threshold value so as to obtain the target duration time based on a temperature reduction characteristic during the EV mode operation;

estimating a travel pattern along a travel route of the hybrid vehicle;

determining a preferred start timing and a preferred stop timing from the travel pattern; and setting the second threshold value as the target duration time between the start timing and the stop timing.

8. A starting and stopping control device for an internal combustion engine in a hybrid vehicle comprising an internal combustion engine, a power generator driven by the internal combustion engine, and a controller, the controller starting the internal combustion engine when one or more temperature parameters of the internal combustion engine have decreased to a first threshold value during an EV mode operation of the vehicle without a combustion operation of the internal combustion engine, and the controller stopping the internal combustion engine when the temperature parameters have increased to a second threshold value, wherein the control device being configured to: determine a target duration time for the EV mode operation after stopping the internal combustion engine; and set the second threshold value so as to obtain the target duration time based on a temperature reduction characteristic during the EV mode operation, the temperature reduction characteristic being given as a function of at least one of outside air temperature and vehicle speed.

* * * * *